United States Patent [19]

Alten

[11] Patent Number: 4,835,806
[45] Date of Patent: Jun. 6, 1989

[54] TRANSFER BRIDGE FOR A DOCK

[76] Inventor: Kurt Alten, Ringstr. 14, D-3015 Wennigsen, Fed. Rep. of Germany

[21] Appl. No.: 175,529

[22] Filed: Mar. 31, 1988

[30] Foreign Application Priority Data

Mar. 31, 1987 [DE] Fed. Rep. of Germany ....... 3710773

[51] Int. Cl.$^4$ .............................................. E01D 1/00
[52] U.S. Cl. ...................... 14/71.1; 49/463; 193/41
[58] Field of Search ...................... 14/69.5, 71.1, 71.3, 14/71.5, 71.7; 49/463; 193/4–6, 38, 41, 2 A; 414/537; 292/302

[56] References Cited

U.S. PATENT DOCUMENTS

| 721,977 | 3/1903 | Teller | 193/6 |
| 1,993,261 | 3/1935 | Colgate | 14/71.1 |
| 3,994,543 | 11/1976 | Melugin | 292/302 X |
| 4,274,172 | 6/1981 | Franklin | 14/69.5 |
| 4,570,277 | 2/1986 | Hahn et al. | 14/71.1 |

FOREIGN PATENT DOCUMENTS

| 2549715 | 5/1977 | Fed. Rep. of Germany | 14/71.1 |
| 3443127 | 6/1986 | Fed. Rep. of Germany | 14/71.1 |
| 2135960 | 9/1984 | United Kingdom | 14/71.1 |

*Primary Examiner*—Jerome W. Massie, IV
*Assistant Examiner*—John F. Letchford
*Attorney, Agent, or Firm*—Becker & Becker, Inc.

[57] ABSTRACT

A transfer bridge for a ramp or a dock. The bridge includes a bridge plate, the back end of which is pivotably mounted via a shaft that is disposed in supports. A locking element prevents the shaft from accidentally lifting out of the supports. At the top, the locking element extends about the shaft, and at the bottom, below the shaft, the locking element is detachably connected to the dock.

12 Claims, 1 Drawing Sheet

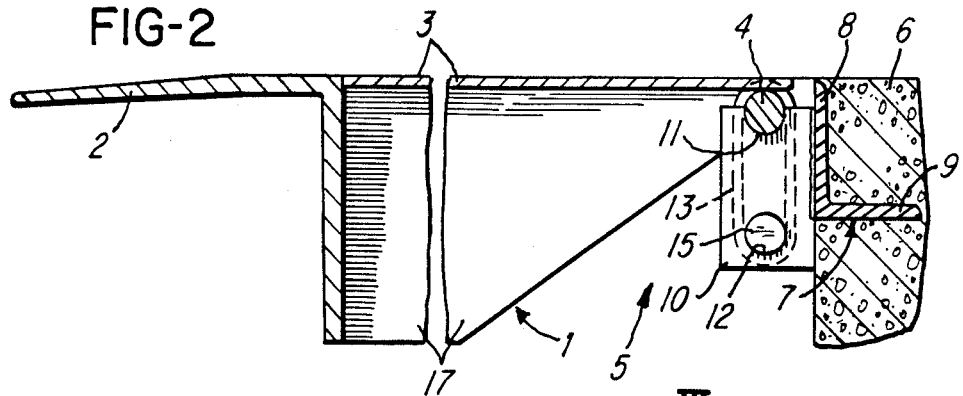
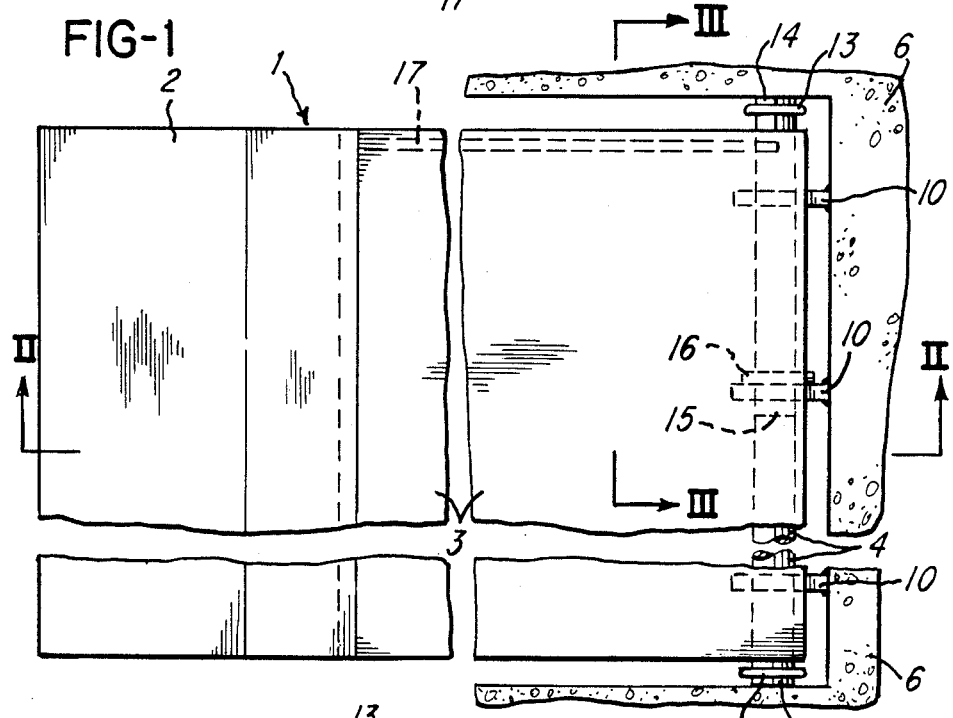
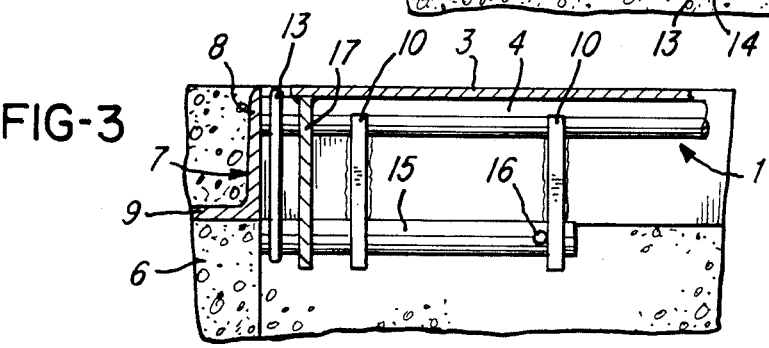

1

TRANSFER BRIDGE FOR A DOCK

BACKGROUND OF THE INVENTION

The present invention relates to a transfer bridge for a ramp or a dock. The bridge includes a bridge plate having a back end that is pivotably mounted on the dock via a horizontal shaft, and a free front end that in an operational position of the bridge plate is adapted to be placed on the platform that is to be loaded or unloaded. The shaft of the bridge plate rests upon one or more supports that are secured to the dock and have an upwardly open recess for receiving the shaft.

A transfer bridge of this general type is known from German Offenlegungsschrift No. 34 43 127, where the bridge plate can be freely lifted off or installed in pivot positions other than the operational position of the bridge plate. In the operational position, an accidental lifting or detachment of the bridge plate from the supports is prevented by a locking rod that is connected to the bridge plate and that engages a fixed support in this operational position. Consequently, the ability to install or remove the bridge plate depends upon the pivotal position of the latter.

It is an object of the present invention to improve a transfer bridge of the aforementioned general type in such a way that installation and removal of the bridge plate is also possible in a horizontal position of the bridge plate, while at the same time an operationally reliable support and retention of the bridge plate is assured.

BRIEF DESCRIPTION OF THE DRAWING

This object, and other objects and advantages of the present invention, will appear more clearly from the following specification in conjunction with the accompanying schematic drawing, in which:

FIG. 1 is a partial plan view of the dock end of one exemplary embodiment of the inventive transfer bridge;

FIG. 2 is a cross-sectional view taken along the line II—II in FIG. 1; and

FIG. 3 is a cross-sectional view taken along the line III—III in FIG. 1.

SUMMARY OF THE INVENTION

The transfer bridge of the present invention includes a locking element that prevents the shaft of the bridge plate from lifting out of the recesses of the supports when the bridge plate is in its operational positions; this locking element is embodied in such a way that its upper end extends about the shaft, and its lower end, below the shaft, is detachably connected to the dock. The locking element is expediently provided with an opening that serves to receive the shaft. This opening can be embodied as an oblong hole that at the top receives the shaft and at the bottom receives a detachable retaining rod.

Prior to installation of the bridge, the locking element is placed upon the shaft or is connected thereto. After the shaft is disposed in the shell-like supports, i.e. in the recesses thereof, the locking element or elements, below the bridge plate, are detachably connected to the dock, for example via the aforementioned retaining rods.

A particularly straightforward securement of the bridge plate can be obtained if the locking element is in the form of a chain link, especially a link for a round steel rod chain. In addition, it is very advantageous if locking elements extend about the shaft and rods on both sides of the bridge plate, with ends of the shafts and rods extending laterally beyond the edges of the bridge plate. Here the locking elements can be placed upon the shaft without obstruction.

Further specific features of the present invention will be described in detail subsequently.

DESCRIPTION OF PREFERRED EMBODIMENTS

Referring now to the drawing in detail, the free front end of the bridge plate 1 is provided with an extension 2 that can be placed upon a platform that is to be loaded or unloaded. The dock end of the bridge plate 1, below the cover plate 3 thereof, has a transversely extending shaft 4 that is in the form of a rod, for example a round steel rod.

The bridge plate 1 is disposed with little play in a recess 5 of the ramp or dock 6, and can be introduced therein. The top of the recess 5 is circumscribed by angle irons 7, the vertical legs 8 of which circumscribe the top of the recess 5, while the horizontal legs 9 are embedded. The length of the shaft 4 is slightly greater than the width of the bridge plate 1. As a result, the end faces of the shaft 4 practically rest against the adjacent vertical surfaces of the recess 5.

In order to pivotably mount the bridge plate 1, a plurality of vertical support plates or brackets 10 are distributed over the width of the bridge. The brackets 10 are welded to the vertical leg 8 of the angle iron 7, and are provided at the top with a semicircular recess 11 in which the shaft 4 can be placed. Disposed vertically below the recess 11 in the brackets 10 is a hole 12, the diameter of which practically corresponds to the shaft 4 or the diameter that defines the recess 11.

In order to prevent an accidental lifting of the bridge plate 1, in other words a lifting of the shaft 4 out of its supports, i.e. the recesses 11, two locking elements are provided; one on each side of the bridge. These locking elements are in the form of links 13 of a round steel rod chain. The inside width of the links 13 corresponds to the diameter of the shaft 4, and the diameter of the round steel rod of the links 13 is no greater than the thickness of the cover plate 3. The links 13 extend over the laterally protruding stubs or ends 14 of the shaft 4, and also extend around a retaining rod 15 that extends parallel to the shaft 4 and is disposed vertically therebelow. A given retaining rod 15 is mounted in two adjacent brackets 10 by being inserted into the holes 12 thereof. The retaining rod 15 is prevented from shifting by a holding pin 16 (see FIG. 3). The link 13, which is thus prevented from being pulled off from the top, in turn prevents an accidental lifting of the bridge plate 1 as a result of being lifted out of the shell-shaped supports.

In order to install or remove the bridge plate 1, the retaining rod 15 is removed. The bridge plate 1 can then be freely raised, together with the links 13 that are disposed on both sides, and can again be deposited.

Accidental shifting of the two links 13 cannot occur because due to the small amount of clearance between the bridge plate 1 and the dock 6, the links 13 cannot swing or tilt. Also assisting in accomplishing this is the side plate 17 that closes off the side of the bridge plate 1 (see in particular FIG. 3).

The present invention is, of course, in no way restricted to the specific disclosure of the specification and drawing, but also encompasses any modifications within the scope of the appended claims.

What I claim is:

1. A transfer bridge for a dock, said bridge including a bridge plate having a back end that is pivotably mounted on said dock via a horizontal shaft of said bridge plate, and a free front end that in operational positions of said bridge plate is adapted to be placed on a platform that is to be loaded or unloaded, with said shaft of said bridge plate resting upon one or more supports that are secured to said dock wherein each of said supports has an upwardly open recess for receiving said shaft; said bridge further comprises:

at least one locking element that prevents said shaft from lifting out of said recesses of said supports when said bridge plate is in its operational positions, with said at least one locking element extending about said shaft from above, and therebelow is detachably connected to said dock.

2. A transfer bridge according to claim 1, in which said locking element is provided with an opening that serves to receive said shaft.

3. A transfer bridge according to claim 1, which includes retaining rod means connected to said dock; and in which said at least one locking element is provided, below said shaft, with an opening for receiving said retaining rod means.

4. A transfer bridge according to claim 1, which includes retaining rod means connected to said dock; and in which said at least one locking element is provided with an oblong hole for receiving said shaft and said retaining rod means.

5. A transfer bridge according to claim 4, in which said locking element has the configuration of a chain link.

6. A transfer bridge according to claim 5, in which said locking element has the configuration of a link of a round steel rod chain.

7. A transfer bridge according to claim 4, in which said retaining rod means is disposed in said supports of said dock, parallel to said shaft, in such a way that said retaining rod means can be shifted longitudinally yet can also be secured in position.

8. A transfer bridge according to claim 7, in which said retaining rod means has end face means disposed closely adjacent said dock, with little clearance, in said operational positions of said bridge plate; and which includes pin means to prevent said retaining rod means from shifting in a direction away from said dock.

9. A transfer bridge according to claim 1, in which said at least one locking element extends about said shaft in a zone disposed to the side of said bridge plate between the latter and said dock.

10. A transfer bridge according to claim 9, in which said bridge plate is provided with side plates to delimit the sides of said bridge plate, with said side plates being disposed directly adjacent to said at least one locking element.

11. A transfer bridge according to claim 9, in which said shaft of said bridge plate has two ends, each of which extends laterally beyond said bridge plates and has an end face disposed closely adjacent said dock so that practically no clearance exists therebetween; and which includes two locking elements, each of which extends about one of said ends of said shaft.

12. A transfer bridge according to claim 11, which includes two retaining rods, each of which is disposed in said supports of said dock and has one of said locking elements extending thereabout.

* * * * *